(12) United States Patent
Stroud et al.

(10) Patent No.: US 9,953,349 B2
(45) Date of Patent: Apr. 24, 2018

(54) PLATFORM FOR SERVING ONLINE CONTENT

(71) Applicant: CBS Interactive Inc., San Francisco, CA (US)

(72) Inventors: Monica Stroud, San Francisco, CA (US); Eric Harper, San Francisco, CA (US)

(73) Assignee: CBS Interactive Inc., San Francisco, CA (US)

( * ) Notice: Subject to any disclaimer, the term of this patent is extended or adjusted under 35 U.S.C. 154(b) by 764 days.

(21) Appl. No.: 14/523,765

(22) Filed: Oct. 24, 2014

(65) Prior Publication Data

US 2015/0112820 A1 Apr. 23, 2015

Related U.S. Application Data

(63) Continuation of application No. 12/947,416, filed on Nov. 16, 2010, now Pat. No. 8,904,277.
(Continued)

(51) Int. Cl.
*G06F 17/00* (2006.01)
*G06Q 30/00* (2012.01)
(Continued)

(52) U.S. Cl.
CPC ....... *G06Q 30/0277* (2013.01); *G06F 17/212* (2013.01); *G06F 17/218* (2013.01);
(Continued)

(58) Field of Classification Search
CPC .... G06F 17/212; G06F 17/3089; G06F 17/24; G06F 17/272; G06F 17/2258;
(Continued)

(56) References Cited

U.S. PATENT DOCUMENTS 5,553,217 A 9/1996 Hart et al.
5,887,133 A 3/1999 Brown et al.
(Continued)

FOREIGN PATENT DOCUMENTS

WO WO 99/59283 A2 11/1999
WO WO 2012/030550 3/2012

OTHER PUBLICATIONS

Free Webinar, "4 Easy Ways to Get Advertisers on Your Site", Jul. 24, 2006, https://www.entrepreneur.com/article/159412, pp. 2.*
(Continued)

*Primary Examiner* — Chau T Nguyen
(74) *Attorney, Agent, or Firm* — Rimon, P.C.; Marc Kaufman

(57) ABSTRACT

A computer implemented method for creating a page including content includes the steps of inserting, with a computing device, one or more placeholders in the page, requesting, with a computing device, parameters, receiving, with a computing device, meta data in response to the step of requesting parameters, creating, with a computing device, frames in the page based on the meta data at positions corresponding to the placeholders, requesting, with a computing device, content, receiving, with a computing device, content in response to the request for content, and placing the content in the frames for display on a display device.

20 Claims, 6 Drawing Sheets

Related U.S. Application Data

(60) Provisional application No. 61/378,478, filed on Aug. 31, 2010.

(51) Int. Cl.

| | | |
|---|---|---|
| *G06Q 30/02* | (2012.01) | |
| *G06F 17/22* | (2006.01) | |
| *G06F 17/27* | (2006.01) | |
| *G06F 17/24* | (2006.01) | |
| *G06F 17/21* | (2006.01) | |
| *G06F 17/30* | (2006.01) | |

(52) U.S. Cl.
CPC ........ *G06F 17/2264* (2013.01); *G06F 17/243* (2013.01); *G06F 17/248* (2013.01); *G06F 17/272* (2013.01); *G06F 17/2705* (2013.01); *G06F 17/30017* (2013.01); *G06F 17/3074* (2013.01); *G06F 17/3089* (2013.01); *G06F 17/30345* (2013.01); *G06F 17/30781* (2013.01)

(58) Field of Classification Search
CPC .. G06F 17/218; G06F 17/2264; G06F 17/243; G06F 17/248; G06F 17/2705; G06F 17/30017; G06F 17/30781; G06F 17/3074; G06F 17/30345; G06Q 30/0277
See application file for complete search history.

(56) References Cited

U.S. PATENT DOCUMENTS

| | | | |
|---|---|---|---|
| 5,933,811 A | 8/1999 | Angles et al. | |
| 5,999,912 A | 12/1999 | Wodarz et al. | |
| 6,038,598 A | 3/2000 | Danneels | |
| 6,317,761 B1 | 11/2001 | Landsman et al. | |
| 6,449,765 B1 | 9/2002 | Ballard | |
| 6,477,509 B1 | 11/2002 | Hammons et al. | |
| 6,496,857 B1 | 12/2002 | Dustin et al. | |
| 6,981,224 B1 | 12/2005 | Gardner et al. | |
| 6,986,100 B1 | 1/2006 | Roper et al. | |
| 7,003,734 B1 | 2/2006 | Gardner et al. | |
| 7,840,890 B2 | 11/2010 | Lund | |
| 7,953,700 B2 | 5/2011 | Fujimura | |
| 8,028,233 B1 | 9/2011 | Florschuetz et al. | |
| 8,185,830 B2 | 5/2012 | Saha et al. | |
| 9,483,449 B1* | 11/2016 | Wood ................. | G06F 17/30899 |
| 2001/0005855 A1 | 6/2001 | Shaw et al. | |
| 2001/0039510 A1 | 11/2001 | Galomb | |
| 2001/0047297 A1 | 11/2001 | Wen | |
| 2002/0032677 A1 | 3/2002 | Morganthaler et al. | |
| 2002/0036654 A1 | 3/2002 | Evans et al. | |
| 2002/0147645 A1 | 10/2002 | Alao et al. | |
| 2002/0188527 A1 | 12/2002 | Dillard et al. | |
| 2002/0188635 A1 | 12/2002 | Larson | |
| 2003/0110171 A1 | 6/2003 | Ozer et al. | |
| 2003/0146939 A1 | 8/2003 | Petropoulos et al. | |
| 2003/0167447 A1 | 9/2003 | Hatta et al. | |
| 2003/0191693 A1 | 10/2003 | Aphek | |
| 2004/0015783 A1 | 1/2004 | Lennon et al. | |
| 2004/0030597 A1 | 2/2004 | Bibas | |
| 2004/0254853 A1 | 12/2004 | Heene et al. | |
| 2005/0027594 A1 | 2/2005 | Yasnovsky et al. | |
| 2005/0038700 A1 | 2/2005 | Doemling et al. | |
| 2005/0044192 A1 | 2/2005 | Applin et al. | |
| 2005/0222905 A1 | 10/2005 | Wills | |
| 2006/0149632 A1 | 7/2006 | Register et al. | |
| 2006/0248442 A1 | 11/2006 | Rosenstein et al. | |
| 2007/0067297 A1 | 3/2007 | Kublickis | |
| 2008/0046562 A1 | 2/2008 | Butler | |
| 2008/0098075 A1 | 4/2008 | O'Bryan et al. | |
| 2008/0154708 A1 | 6/2008 | Allan et al. | |
| 2008/0187279 A1 | 8/2008 | Gilley et al. | |
| 2008/0281689 A1 | 11/2008 | Blinnikka et al. | |
| 2009/0013347 A1 | 1/2009 | Ahanger et al. | |
| 2009/0049373 A1 | 2/2009 | Sharma et al. | |
| 2009/0055749 A1 | 2/2009 | Chatterjee et al. | |
| 2009/0070190 A1 | 3/2009 | Gorty et al. | |
| 2009/0099901 A1* | 4/2009 | Sah ........................ | G06Q 30/02 715/209 |
| 2009/0144129 A1 | 6/2009 | Grouf et al. | |
| 2009/0199230 A1* | 8/2009 | Kumar ................... | G06Q 30/02 725/32 |
| 2009/0307258 A1* | 12/2009 | Priyadarshi .... | H04N 21/234318 |
| 2009/0319355 A1 | 12/2009 | Sinyagin et al. | |
| 2010/0076994 A1 | 3/2010 | Soroca et al. | |
| 2010/0082440 A1 | 4/2010 | Vaidyanathan et al. | |
| 2010/0161417 A1* | 6/2010 | Mitsui .................... | G06Q 30/02 705/14.54 |
| 2011/0016487 A1* | 1/2011 | Chalozin ............... | G06T 19/006 725/35 |
| 2011/0029393 A1* | 2/2011 | Apprendi ........... | G06Q 30/0277 705/14.73 |
| 2011/0161178 A1 | 6/2011 | Rosenstein et al. | |

OTHER PUBLICATIONS

"AdCycle: Ad Management Software", AdCycle.com, http://web.archive.org/web/20020212085236/http://www.adcycle.com/getting_started.html, Published Feb. 12, 2002. pp. 1-3.

Cai et al, "VIPS: a Vision-based Page Segmentation Algorithm", Microsoft, Nov. 1, 2003, 29 pages.

* cited by examiner

PLATFORM FOR SERVING ONLINE CONTENT

PRIORITY CLAIM

This application is a Continuation of U.S. patent application Ser. No. 12/947,416, entitled "PLATFORM FOR SERVING ONLINE CONTENT", filed Nov. 16, 2010, which claims the benefit of U.S. Provisional Application No. 61/378,478, entitled "PLATFORM FOR SERVING ON-LINE ADVERTISEMENTS", filed Aug. 31, 2010; the aforementioned priority applications being hereby incorporated by reference in their respective entirety for all purposes.

BACKGROUND

Much on-line content, such as content presented in web pages, is provided free of charge to the user. Web site owners and content owners utilize various revenue models to monetize the content. Advertising models are the most common revenue model on the web today. Web site owners and content owners are compensated by directly or indirectly allowing ads to be displayed in connection with the content.

There are two primary ad revenue models on the internet, CPM and CPC. "CPM" stands for "cost per thousand" (where M denotes "mille", meaning "thousand" in Latin). In this model, the site owner charges advertisers a rate (for example 10 cents per thousand) based on the number of the advertiser's ads shown to site visitors. "CPC" stands for "cost per click". In this model, advertisers are charged based on the number of times users click on links in the ads. Ads may be served by the site owners or through a third-party ad network service, such as Google™ Adsense™.

In a simple form, ads can merely be displayed in a static manner along with content. An early form of internet advertising was the static "banner" ad, i.e. a single advertisement displayed across the top portion of the web page along with the content. However, in recent years, the serving of ads has become more sophisticated and, thus, more complex. For example, plural ads are displayed on a web page in coordination with each other. Also, ads are presented as static images, video clips, audio clips and the like. As a result, many guidelines and standard practices have emerged regarding the display of plural ads in coordination with each other and in coordination with content. For example, the Interactive Advertising Bureau ("IAB"), a trade association of leading media and technology companies who are responsible for selling a majority of online advertising in the United States, has promulgated such guidelines.

Recently, it has become desirable to serve ads in an even more complex manner. For example, various business models require that rules be applied to serving ads. An advertiser might want to be guaranteed that their ad will not be displayed on a page with an ad for a competitor. Also, it may be desirable to display an ad at a specified frequency or it may be desirable to display multiple ads in synchronization with each other. Such rules are difficult to implement when displaying ads in a refreshable manner.

For example, when an ad is to be changed, i.e. refreshed, the entire page can be refreshed by making a new request to the server. However, this requires that the entire process of making the page be reiterated, including making new ad requests from the ad network services serving ads on the page. Such a process is resource intensive.

Figure 1:
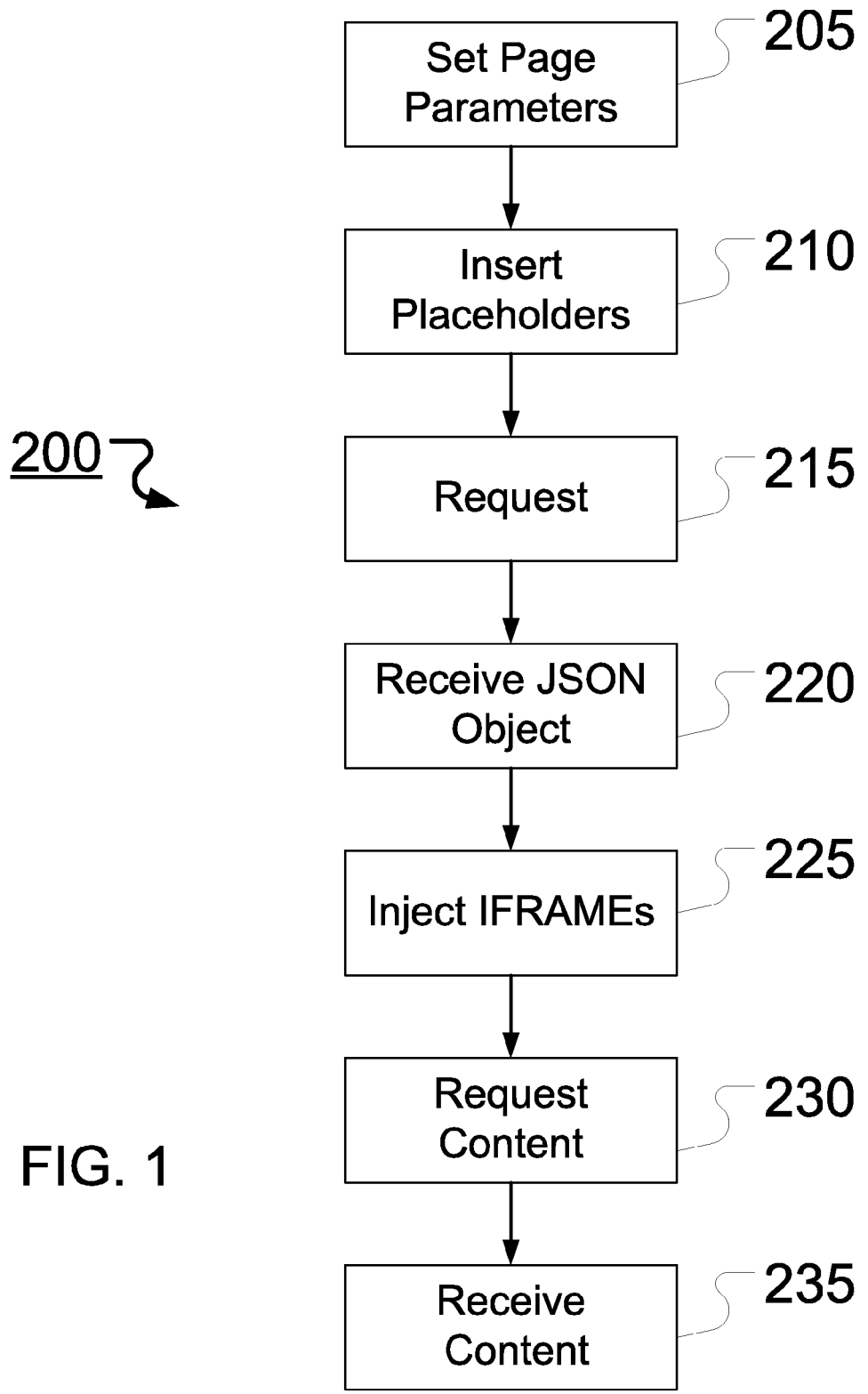
FIG. 1 is a flow chart illustrating a process for loading a page configured to allow asynchronous updating of content (e.g., refreshable ads).

While the system and method is described herein by way of example and embodiments, those skilled in the art recognize that the platform for serving on-line advertisements is not limited to the embodiments or drawings described. It should be understood that the drawings and description are not intended to limit embodiments to the particular form disclosed. Rather, the intention is to cover all modifications, equivalents and alternatives falling within the spirit and scope of the invention defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Disclosed embodiments utilize a process which allows refreshable content serving to be accomplished on the client side. This permits content, such as ads or other creatives, to be refreshed in a much simpler and less resource intensive manner than was available with prior content serving platforms. This also allows some content to be refreshed independently from other content on a page and for creatives to be refreshed independently of one another.

Exemplary pseudo code for a webpage including online advertisements is set forth below.

```
Function Library
    Global Object
    Proxy Location
        Local Ad Object
        Ad DIV
    .
    .
    .
        Local Ad Object
        Ad DIV
        GET_DEFERED_ADS
```

When loading a page, such as a webpage for display, ads are loaded at the "bottom" of the page, regardless of the display position and order of the ads and other content on the page. A special function library is loaded to provide the requisite functions. A global object is created and registered to define global parameters of pages, such as branding elements, the site identification of the page, where a page is located on a network, and the like. The registration may allow an ad serving system to know where the global object is without requiring a data specific name. A proxy location is passed in to make inline frames ("IFRAMEs") and JavaScript Object Notation ("JSON") requests appear to be from a local domain (i.e., create "friendly" IFRAMEs). The use of "friendly" IFRAMEs and JSON requests are discussed in more detail below. This mechanism allows the IFRAMEs to interact with other portions of the page. Local ad objects are created to specify the content, position, and the like of ads for the page.

Placeholders, for example DIV tags, are used to define positions for ads in the page. Subsequently, a function, e.g. GET_DEFERRED_ADS, is executed and iterated over the placeholders to build an ad request based on the parameters of the global object and a local object. The ad request, for example a JSON request, is then made and, in response, a JSON object is sent to the client. The client then parses the JSON object to receive frames to be placed in the place holders. Next, the frames (e.g., IFRAMEs) are injected into each placeholder. The frames then request the ad content and the received ad content is injected into the frames on the page. This architecture/methodology may be utilized in the manner described below to refresh ads while respecting various business rules.

The GET_DEFERRED_ADS function may also refresh ads on the page. For example, a JavaScript may again call GET_DEFERRED_ADS, for example in response to a user action (e.g., a user hovering the mouse pointer over specific content on the webpage), in response to an advertisement shown in a video stream, or in response to any other triggering event. In response to the trigger, the function may refresh all ads, for example by again calling GET_DEFERRED_ADS in the same fashion as when the page first loaded. Alternatively, additional information may be passed to the GET_DEFERRED_ADS function to specify which specific ads should be refreshed. Further still, information may be passed to the GET_DEFERRED_ADS function to determine which ad content should be retrieved for the refreshed ad, for example a specific ad to insert, a category or set of ads to insert one of, a category or set of ads to avoid, etc.

Figure 4:
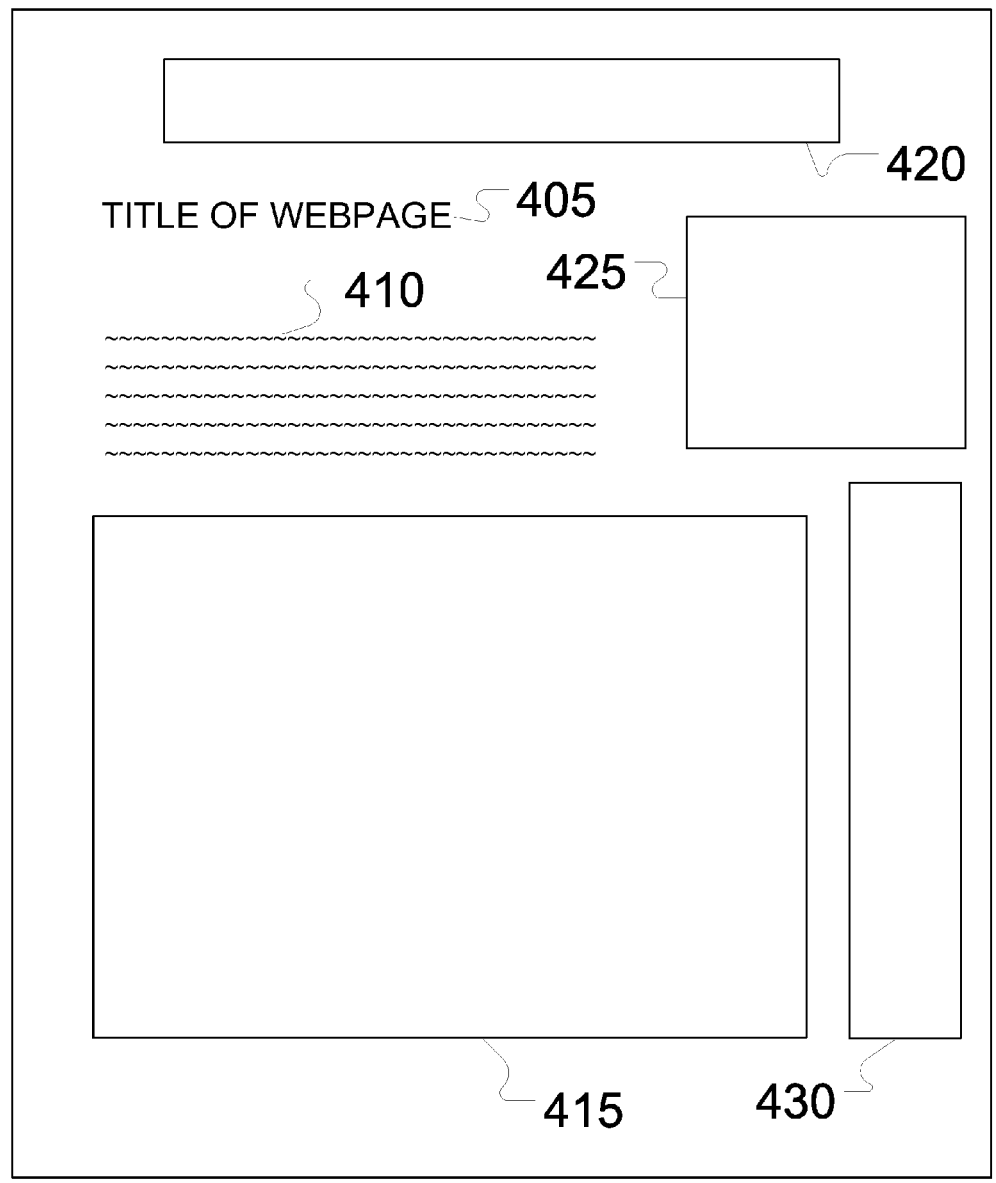
FIG. 4 is a schematic illustration of an exemplary webpage rendered in a browser having in-page ads.

FIG. 4 illustrates an exemplary webpage 400 rendered in a browser having in-page ads. Webpage 400 may include any content, for example a title 405, text 410, and media 415. Media 415 may, for example, be streaming video, a Flash™ application, a rich internet application ("RIA"), or any other media that may be delivered to a browser. Webpage 400 also includes a leaderboard ad 420, a medium rectangle ("MPU") ad 425, and a skyscraper ("SKY") ad 430. In conjunction with the pseudo code noted above, leaderboard ad 420, MPU ad 425, and SKY ad 430 may be deferred ads. Thus, when the pseudo code runs, first placeholders may be created in the locations where leaderboard ad 420, MPU ad 425, and SKY ad 430 will be placed. Next, page content, including title 405, text 410, and media 415 may be rendered in the browser. After the page content is rendered, the ad parameters are passed to the ad server. The ad parameters are then parsed and the returned ad meta data includes the frames which are inserted into the placeholders. The frames then request ad content from the ad server and the ad server sends ad content to display in leaderboard ad 420, MPU ad 425, and SKY ad 430.

By deferring loading ads until after content on a webpage is loaded, greater bandwidth and processor usage may be dedicated to loading content. Thus, a user may read, watch, or listen to the content on the webpage without having to wait for ads to load. Even static ads that may not be refreshed may be deferred according to the above pseudo code to allow page content to load before the static ads. Of course, embodiments also support webpages including both conventional static ads and deferred ads.

In response to a future trigger, any or all of leaderboard ad 420, MPU ad 425, and SKY ad 430 may be refreshed. For example, an embodiment may be configured to refresh MPU ad 425 and SKY ad 430 after a given time period. In such an embodiment, a request for ad parameters may be made and a variable may be passed with the request indicating that only MPU ad 425 and SKY ad 430 should be refreshed. The ad server then sends ad meta data in response, the ad meta data are parsed, frames included in the ad meta data are inserted into the placeholders, the frames request ad content from the ad server, and the ad server sends ad content to be displayed in MPU ad 425, and SKY ad 430.

FIG. 1 shows a flow chart illustrating a process 200 for loading a page configured to allow asynchronous updating of content, such as advertisements (e.g., refreshable ads) or other creatives. In step 205, page parameters are set, which may include creating and registering the global object and inserting a proxy location. The proxy location may be to a content proxy server. The proxy may cure cross-domain issues by making files, e.g., JSON objects, IFRAMEs, and content, appear to be located on the same domain and/or port as the final rendered document. The following shows an exemplary Apache configuration that a webserver, such as a server located at the domain GAMESPOT.COM, might use to configure "/mac" as a proxy for http://mads.gamespot.com/mac-ad with a 1 second timeout.

```
<IfModule mod_proxy.c>
    ProxyTimeout 1000
    ProxyPass /mac http://mads.gamespot.com/mac-ad
    ProxyPassReverse /mac http://mads.gamespot.com/mac-ad
</IfModule>
```

Generally, when an IFRAME is inserted into a webpage it is "unfriendly" if it loads from a different domain. Browsers generally have different rules that apply to IFRAMEs that load content from a different domain rather than the same domain. If the content is loaded from the same domain, then content inside of the IFRAME is allowed to jump out of the IFRAME and interact with the parent page. In other words, a friendly IFRAME (i.e., from the same domain) is able to modify the parent page. Because the IFRAMEs are loading information from a remote domain (e.g., an ad server), the IFRAME must interact with the remote domain through the above-noted proxy so that the browser believes that it is interacting with the same domain. This allows the browser to perceive the IFRAME as friendly and, thus, allow the IFRAME to interact with the parent page.

JavaScript behaves in similar fashion, allowing JSON objects to be loaded only from the local domain. Therefore, the proxy is used for the JSON requests as well. In other words the JSON is requested from the proxy but the JSON object is actually received from another server. Still, the browser perceives the JSON object as coming from the same domain.

In step 210, placeholders are defined where content should be displayed, for example by inserting DIV tags in the HTML code of the page. Placeholders may be defined, for example, by adding a DIV to the document and giving the DIV a unique ID. For example, a DIV tag with the unique ID "MAD_SKY" may be written as <div id="MAD_SKY"></div>. This exemplary DIV may be a placeholder for SKY ad 430 shown in FIG. 4. Embodiments may require each placeholder to have a unique name so that the code can find the proper placeholder DIV to hold each piece of content. A function, for example a JavaScript function, may be defined to setup unique placeholder DIVs. When such a function is called, it may check to see if a DIV by a specified name already exists. If it does, the function will use the named DIV as the placeholder. Otherwise, the function will add a new DIV with the specified name. In either case, a reference to the specified name of the DIV may be saved, for example in an array, for later access.

The placeholders may be pre-set to a determined height and/or width. In this case, the page may show a blank block until content is loaded in the placeholder. Alternatively, the placeholder may not have a set height and/or width and, thus, the ad content may appear to "twitch" or "flicker" and move content around while ad content is loading.

In step 215, content requests are made. At the bottom of the page, for example after page content is loaded but before behavioral code is inserted into the page, a content request (e.g., ad call), for example a JSON ad request, may be loaded, for example by calling a function GET_DEFERRED_ADS. JSON is a JavaScript notation that can be used for requesting data to be received in a JavaScript object format that can then be manipulated as an object. When the content request is made, the code iterates over a list of the names of placeholder DIVs to be refreshed, for example stored in an array, or all placeholder DIVs in embodiments if no list was indicated, and builds a content request, for example a JSON ad request or an asynchronous JavaScript and XML ("AJAX") ad request, for the content indicated. The content request may include a cumulative PageState variable, for example including information relating to any inline static ads or other content, and a segment (i.e., individual) PageState variable from any deferred ads or other content not included in the list passed with the content request (e.g., not passed into GET_DEFERRED_ADS). The PageState variables are discussed in more detail below. The content request may be based on the global and local objects in the page. Exemplary syntax for a JSON ad request to retrieve two ads, a SKY ad (e.g., SKY ad 430 shown in FIG. 4) and an MPU ad (e.g., MPU ad 425 shown in FIG. 4) is set forth below.

```
{local_mac_proxy_uri}?META&ADSEPARATOR=%2C&GLOBAL&CELT=J
SONFIF&REMOTE_ADDR=%%REMOTE_ADDR%%&UA&%%&
BRAND=2&SITE=24&NCAT=6037:6218:&PAGESTATE={staticPageStat
eValue}&COMB_PAGESTATE={tokenized_pagestates_from_any_deferr
ed_ad_not_included_in_this_ad_request}&MAC_PROXY={local_mac_p
roxy_uri}&ADREQ&SP=18&POS=100&DIVID=MAD_SKY_&ADREQ&SP
=16&POS=100&DIVID=MAD_MPU.
```

This code also illustrates the path (i.e., uniform resource identifier ("URI") on the local domain that will act as a proxy for requests to the ad client).

The JSON ad request allows for multiple ads to be returned in a JSON object in response to a single request for ads, for example the first request for deferred ads when a page is first loaded (i.e., when the GET_DEFERRED_ADS function is first called at the bottom of a page) or for any subsequent request to refresh ads when more than one ad is to be refreshed. The multiple ads are received as a JSON object. The JSON object is then parsed apart. One of the elements stored in the JSON object is "body text", which is what will be placed inside the placeholders (e.g., DIVs). The body text contains the IFRAME that has a friendly universal resource locater ("URL"). The friendly URL talks to the proxy and is redirected to an ad server to retrieve the actual content of each ad. Thus, JSON objects allow ads to be individually refreshed and allow for multiple ad requests. For example, the JSON objects may allow for a page to request three ads to be refreshed in response to a behavior or trigger. Thus, in the video context, a page configured to trigger in-page ads to refresh in response to an ad being played in a streaming video may send a JSON request for three in-page ads in response to an ad being played in the video stream and, in response, the page may receive a JSON object containing three ads to be inserted in the in-page frames.

In step 220, JSON objects are received from the server, through the proxy, in response to the content requests. An exemplary JSON object received in response to the ad request shown above is shown below.

```
{   divId: "MAD SKY",
    segmentId: "9107890",
    rotatorId: "7109",
seg_pageState: "{values pertinent to the pagestate of this ad}",
bodyText: "<iframe src='${MAC_ PROXY}?adfile={path to the
FIFC version of the .ca file}&{all other targeting parameters}'
marginwidth=' 0' marginheight= '0' hspace='0' vspace='0'
frameborder='0' scrolling='no' allowtransparency='true'
background-color='transparent'></iframe>"
},
{   divId: "MAD_ MPU",
    segmentId: "9108759",
    rotatorId: "8119",
    seg_pageState:"{values pertinent to the pagestate of this ad}",
    bodyText: "<iframe src=' ${MAC_ PROXY}?adfile={path
to the FIFC version of the .ca file} & {all other targeting
parameters}' marginwidth='0' marginheight='0' hspace='0'
vspace='0' frameborder='0' scrolling='no'
allowtransparency='true'
    background color='transparent'></iframe>"
    )
```

The exemplary JSON objects shown above do not include impression tracking strings and do not modify the cumulative PageState. Of course, known impression tracking techniques can be used and can serve as triggers for refreshing content.

In step 225, the JSON objects are parsed and "friendly" IFRAMEs are injected into the page at the placeholders. "Friendly" IFRAMEs are discussed in greater detail below. In step 230, the content is requested based on the URL stored in the friendly IFRAME. In step 235, the content is received and inserted into the placeholders. An example ad returned inside a placeholder from a proxied IFRAME is shown below.

```
<!DOCTYPE html PUBLIC "-//W3C//DTD HTML 4.01
Transitional//EN"
"http://www.w3.org/TR/html4/loose.dtd">
<html>
<head>
<title>CBSi ad friendly iframe content</title>
```

-continued

```
<script type="text/javascript">
<!--
var madInIframe = true;
var inDapIF = true;
var inFIF =true;
var RMIF = true;
function AdPageOnLoad( )
{ if (parent.RMIFOnLoad)
    { setTimeout('parent.RMIFOnLoad(window, document);',10);
    }
}
//-->
</script>
<base target="_ top"/>
</head>
<body onload='AdPageOnLoad(window, document);' style="overflow:
visible; border:0; background-color :transparent; margin: 0;
fload:left">
<div id = "adDiv" style="overflow: visible; border:0;display: inline-
block">
    {Ad with full adstyles here}
</div>
```

While process 200 for loading a page configured to allow asynchronous updating of content as several independent and discrete steps, one of ordinary skill in the art understands that this illustration is for clarity purposes only. Any or all of the steps illustrated in process 200 may be combined into fewer steps or a single step. Of course, each step of process 200 may also be further divided into sub-steps. Further, one of ordinary skill in the art also understands that well known steps relating to sending a webpage, requesting content, and inserting content into the webpage are omitted for clarity sake only. Additional features disclosed herein relating to both synchronous and asynchronous updating of content may be considered as additional steps in process 200. Any additional steps may be performed before, after, or in parallel with any or all of the steps disclosed in process 200.

Steps of process 200 may be performed at a client computing device, for example a computing device operatively coupled to a display device configured to display the webpage having ads to a user. An exemplary computing device is disclosed below in relation to FIG. 3. Of course, in other embodiments two or more computing devices in communication with each other, for example in a networked environment or across the internet, may each perform part of the method for loading a page according to embodiments disclosed herein.

Process 200 may be performed by a combination of in-page function calls and JSON code executed on a computing device. For example, in-page function calls, executed on a computing device, may perform steps 205-220 and JSON code, executed on a computing device, may perform steps 225-235.

Figure 2:
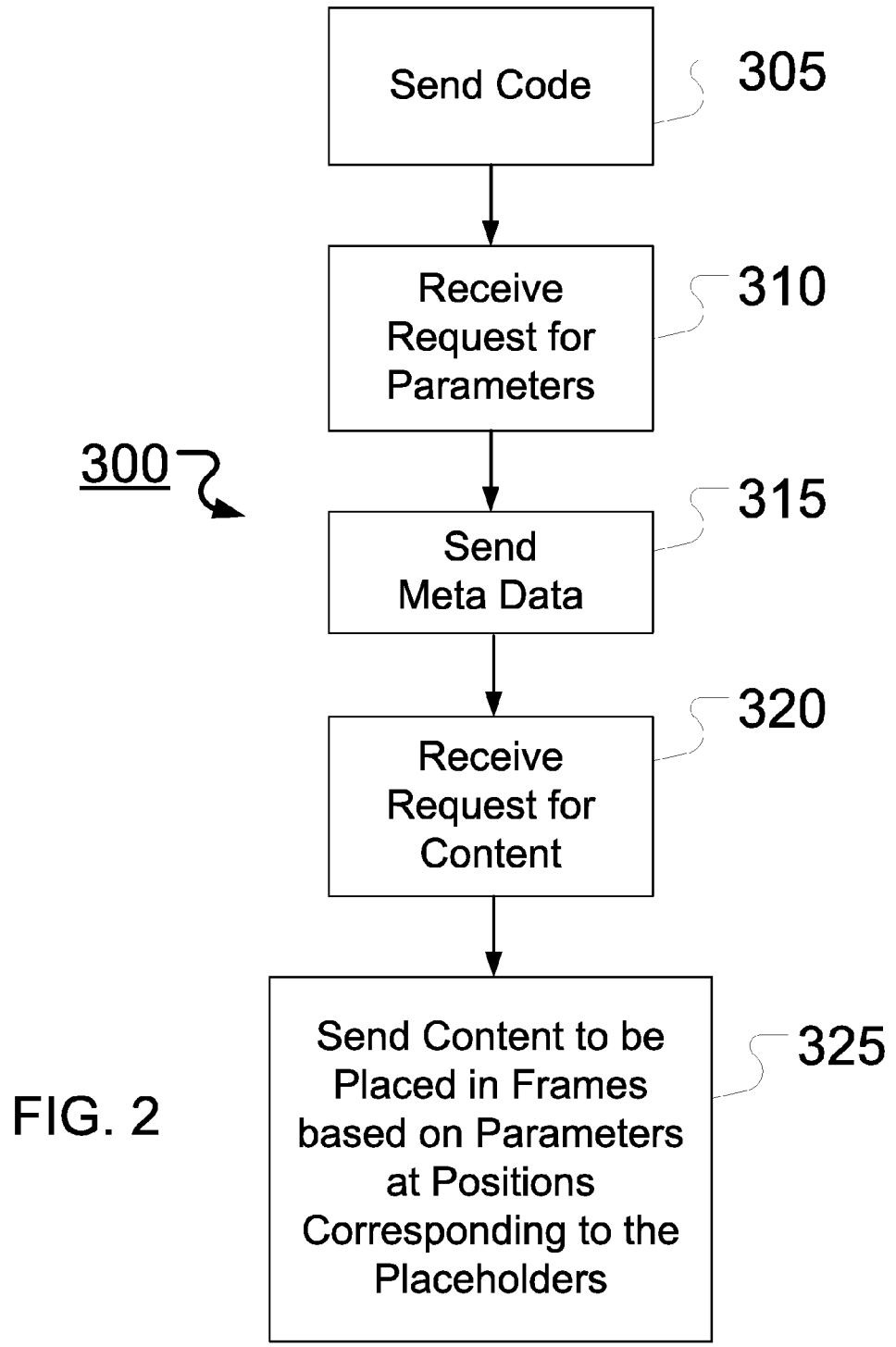
FIG. 2 is a flow chart illustrating a process, performed on the server side, complementary to the process shown in FIG. 1.

FIG. 2 is a flow chart illustrating a process 300, performed on the server side, complementary to process 200, performed on the client side. In step 305, a computing device sends code configured to perform process 200. The code sent in 305 may include a webpage having in-page function calls, for example for requesting and receiving content. At step 310, a computing device receives one or more requests for parameters. In response to receiving the request for parameters, a computing device determines parameters for content to be inserted into the webpage. At step 315, a computing device sends meta data in response to the request of step 310. At step 320, a computing device receives one or more requests for content. In response to receiving the request, a computing device determines content to send. At step 325, a computing device sends content to be placed in frames on the webpage based on parameters at positions corresponding to the placeholders.

As discussed above with reference to process 200, while process 300 illustrates a method for loading a page configured to allow asynchronous updating of content as several independent and discrete steps, one of ordinary skill understands that this illustration is for clarity purposes only. Any or all of the steps illustrated in process 300 may be combined into fewer steps or a single step. Of course, each step of process 300 may also be further divided into sub-steps. Further, one of ordinary skill in the art understands that well known steps relating to sending a webpage, receiving requests for content, and sending content are omitted for clarity sake only. Additional features disclosed herein relating to both synchronous and asynchronous updating of content may be considered as additional steps in flow chart 300. Any additional steps may be performed before, after, or in parallel with any or all of the steps disclosed in process 300.

Steps of process 300 may be performed at a server computing device, for example a web server. An exemplary computing device is disclosed below in relation to FIG. 3. Of course, in other embodiments two or more computing devices in communication with each other, for example in a networked environment or across the internet, such as clustered servers, a server farm, or a cloud network, may each perform part of the method for loading a page according to embodiments disclosed herein.

Additionally, while in some embodiments an entity hosting a webpage (i.e. performing step 305) may also perform the remaining steps of process 300, in alternative embodiments two or more independent entities may each perform separate steps of flow chart 300. For example, a first entity may have a web server configured to send code configured to allow asynchronous updating of ads, for example code configured to perform process 200. A second entity, for example a client computing device, may send a request to the first entity's web server and in response the first entity may send the code configured to allow asynchronous updating of ads. Upon receiving the code, the client computing device may request ad parameters from a third entity, for example Google™ Adsense™. In response to the client's computing device's request, the third entity's computing device may send ad meta data. The client's computing device may then request ad content and the third entity may send ad content to the client's computing device to be placed in frames based on ad parameters at positions corresponding to the placeholders.

Of course, even more entities may perform steps illustrated in flow charts 200 and 300. For example, because the processes provide for asynchronous refreshing of content, a client may request content from multiple content servers, which may be the same as or separate from the web server.

Figure 5:
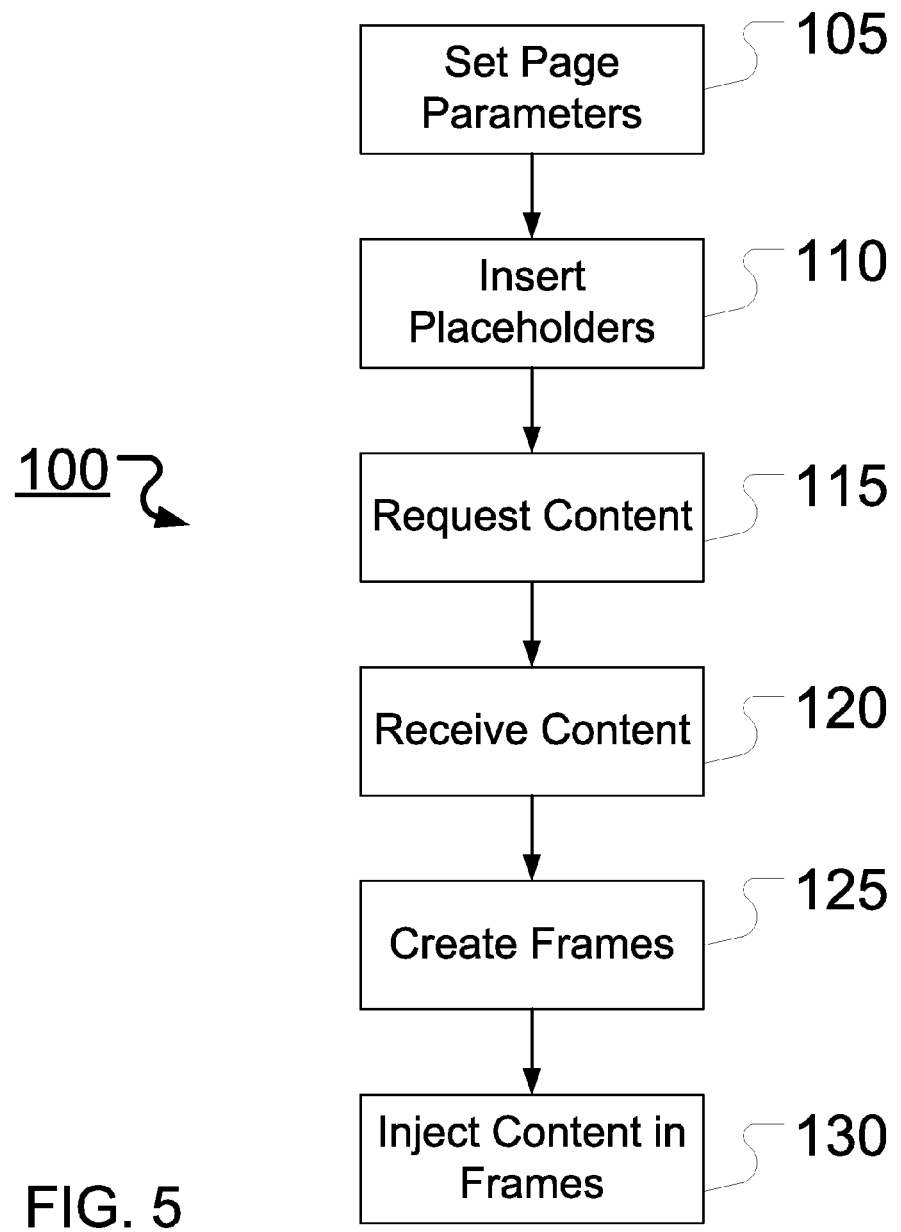
FIG. 5 is a flow chart illustrating a process for loading a page configure to allow asynchronous updating of content.

Other embodiments may omit inserting a proxy location. For example, FIG. 5 is a flow chart illustrating a process 100, performed by a client, allowing for asynchronous updating of content. In step 105, page parameters may be set, including creating and registering the global object. In step 110, placeholders may be defined where content should be displayed. In step 115, a content request, for example a JSONP, or "JSON with padding", object request, may be made. The request may be made in similar fashion to the request in step 215 of process 200 described above, except the content server may transmit a JSONP object containing the content rather than a JSON object containing an IFRAME. The "padding" of the JSONP object may be a JavaScript statement prefix, for example a callback function or an if statement. Because a JSONP object may be served from any domain, the need for a proxy to cure cross-domain issues may be obviated.

In step 120, the JSONP object may be received in response to the request. The JSONP object may contain content, for example an ad or other creative. In step 125, frames may be created, for example IFRAMEs may be dynamically generated in the placeholders defined in step 110. In step 130, the content in the received JSONP object may be injected into the generated IFRAMEs. For example, if the JSONP included HTML for multiple ads, the HTML for each may be injected into the appropriate generated IFRAMEs. Of course, in other embodiments frames, such as IFRAMEs, may be dynamically generated at alternative temporal position in process 100.

Process 100 may be performed by a combination of in-page function calls and JSONP code executed on a computing device. For example, in-page function calls, executed on a computing device, may perform steps 105-120 and JSONP code, executed on a computing device, may perform steps 125 and 130.

Figure 6:
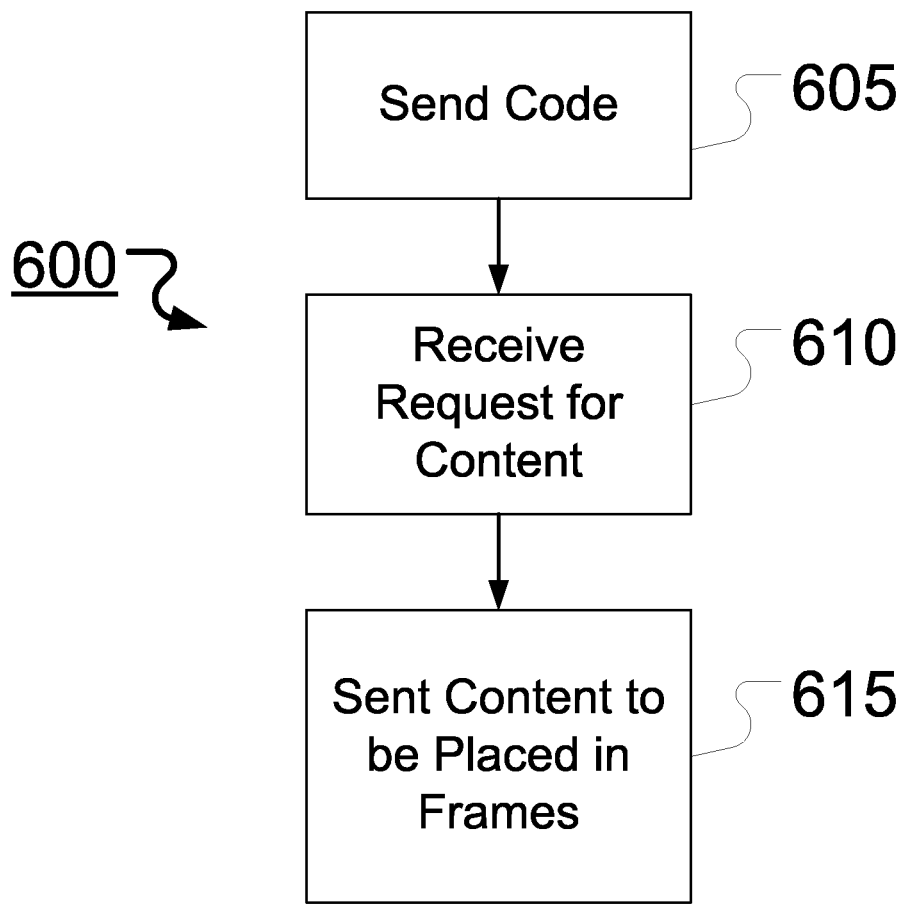
FIG. 6 is a flow chart illustrating a process, performed on the server side, complementary to process shown in FIG. 5.

FIG. 6 is a flow chart illustrating a process 600, performed on the server side, complementary to process 100, performed on the client side. In step 605, a computing device sends code configured to perform process 100. The code sent in 605 may include a webpage having in-page function calls, for example for requesting and receiving content. In step 610, a computing device receives a request for content, such as a request for a JSONP object. In response to receiving the request for content, a computing device determines the content to send and injects the content into a JSONP object. In step 615, a computing device sends the JSONP object containing the content to be placed in frames on a webpage.

Alternatively, client side processes may have substantially similar first steps to processes 100 and 200 (i.e., step 205 may be like step 105 and step 210 may be like step 110). In this case, the process may behave differently depending on the object received in response to the request of step 215 or 115. Similarly, a server side process may be configured to receive either a JSON object request or a JSONP object request, recognize the type of object request received, and perform steps of either process 300 or process 600 according to the recognized object type request.

Figure 3:
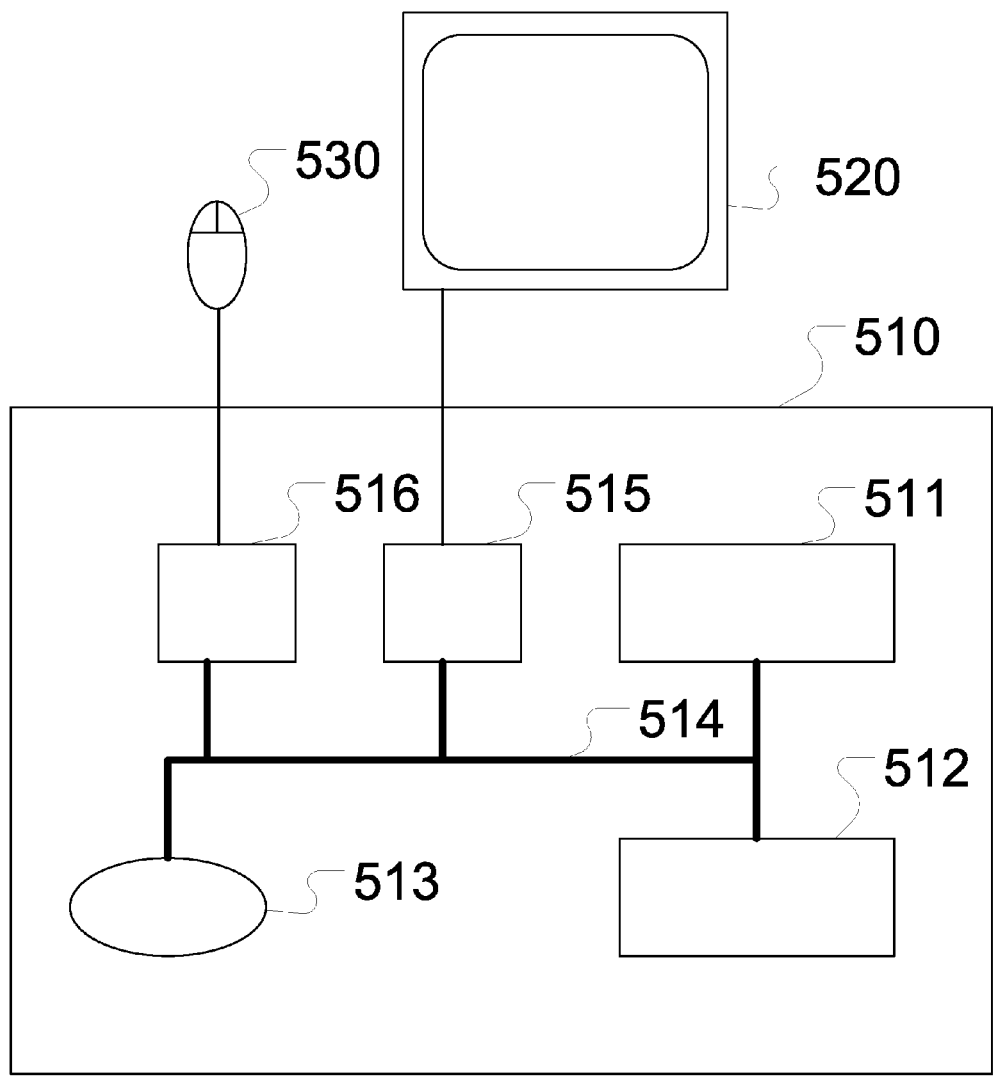
FIG. 3 shows a block diagram of an exemplary computing device useful for performing steps set forth in the processes shown in FIGS. 1 and 2.

These embodiments may be implemented with software, for example modules executed on computing devices such as computing device 510 of FIG. 3. Embodiments may, for example, execute modules corresponding to steps shown in processes 100, 200, 300, and 600. Of course, a single step may be performed by more than one module, a single module may perform more than one step, or any other logical division of steps of processes 100, 200, 300, and 600 may be used to implement the processes as software executed on a computing device.

Computing device 510 has one or more processing device 511 designed to process instructions, for example computer readable instructions (i.e., code) stored on a storage device 513. By processing instructions, processing device 511 may perform the steps set forth in processes 100, 200, 300, and 600. Storage device 513 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 510 additionally has memory 512, an input controller 516, and an output controller 515. A bus 514 operatively couples components of computing device 510, including processor 511, memory 512, storage device 513, input controller 516, output controller 515, and any other devices (e.g., network controllers, sound controllers, etc.). Output controller 515 may be operatively coupled (e.g., via a wired or wireless connection) to a display device 520 (e.g., a monitor, television, mobile device screen, touch-display, etc.) in such a fashion that output controller 515 can transform the display on display device 520 (e.g., in response to modules executed). Input controller 516 may be operatively coupled (e.g., via a wired or wireless connection) to input device 530 (e.g., mouse, keyboard, touch-pad, scroll-ball, touch-display, etc.) in such a fashion that input can be received from a user (e.g., a user may select with input device 530 a webpage having ads to be displayed on display device 520).

Of course, FIG. 3 illustrates computing device 510, display device 520, and input device 530 as separate devices for ease of identification only. Computing device 510, display device 520, and input device 530 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 510 may be one or more servers, for example a farm of networked servers, a clustered server environment, or a cloud network of computing devices, configured to serve web pages and/or ad content.

The systems and methods described above provide the ability to refresh all content on a page or to independently and asynchronously refresh specific content on a page. Thus, embodiments disclosed herein may dynamically update key inputs that influence the content that shows up other than the initial page load. Refreshable content disclosed herein can be synced to other content or other factors, for example streaming content, user actions, user demographic/behavior data, etc. By using asynchronous updating, content may be refreshed based on any criteria without serving a new page. For example, a page may include a function, such as a JavaScript function, that triggers one or more ads to refresh after a given time or in response to a certain user interaction. Alternatively, content on the webpage may trigger one or more ad to refresh. For example, a media player or a Rich Internet Application may trigger one or more in-page ad to refresh.

As discussed above, PageState may be one or more variables sent with the content request having information relating to the content that has already been served into the page. When PageState is sent with a request, the server will use the information stored in the PageState variable to determine which content it should or should not send. The PageState variable may then be updated every time additional content is shown or when a new content request is sent. The PageState variable may, for example, be a hash configured to uniquely identify information relating to ads shown on a webpage.

Embodiments may have two independent PageState variables, cumulative PageState and segment PageState. Cumulative PageState may be a variable configured to store information regarding certain types of content that, when loaded into the page, merely add to the existing PageState. For example, data relating to static ads inserted into a page on the page's initial load may be included in a cumulative PageState variable. These static ads may be loaded when the page is initially loaded and no other ads will ever be loaded in their place without loading a new page. Segment PageState ("seg PageState") may be a variable configured to store information relating to deferred content (e.g., store information about individual ads asynchronously loaded into the page).

When a page first loads, static ads may be loaded as the page is read top to bottom. When a function is executed to get deferred ads at the bottom of the page, the cumulative PageState variable may be passed into the function to allow deferred ads to be selected based on the static ads shown in the page. When each deferred ad is received it includes a seg PageState variable generated to include data relating to the deferred ad. A page may have a plurality of seg PageState variables with a seg PageState variable configured to store data relating to each individual deferred ad.

When a refresh of the deferred ads occurs, all of the deferred ads may be refreshed, one of the deferred ads may be refreshed, or any subset of the deferred ads may be refreshed. In any case, when a function is called to refresh one or more of the deferred ads, both the cumulative PageState variable and any of the seg PageState variables for deferred ads which are not being refreshed, if there are any, may be passed into the function to allow the refreshed deferred ad to be selected based on any of the static ads displayed, the history of the ads displayed in the place of the ad being refreshed, and any other deferred ads being displayed and their histories. Each time a function to refresh the ads is called, the function may send the cumulative PageState variable and any of the seg PageState variables for deferred ads which are not being refreshed with the ad content. The PageState variables, thus, may include data about the static ads as well as data about all deferred ads shown on the page, for example the amount of time the ad was displayed, whether the user interacted with the ad, the time the ad was last displayed, etc. The PageState variables, thus, allow deferred ads to comply with the requirements of competitive blocking, ad synchronization, and frequency capping.

Competitive blocking provides that if a first ad is shown, then a second ad, for example an ad for a competitor, cannot be shown. Competitors for purposes of competitive blocking may be determined in accordance with conventional business tactics. For example, if a Ford™ ad is shown in SKY ad 430 of FIG. 4 then a GM™ ad may not be shown in MPU ad 425. Prior systems provided for competitive blocking, however, the first ad displayed on the page determined the dominant competitor (i.e., GM™ in the example above). Such systems allow for disparities because a company buying a small static ad at the top of a page could effectively block a competitor who paid for a large and dominant ad from having their ad displayed on the page. In contrast, by passing the cumulative PageState as well as the seg PageState variables to the function refreshing ads, embodiments may have the largest ad control, a plurality of ads control, a history of the ads control, etc.

Ad synchronization provides that if a first ad is shown, then a second ad related to the first ad should be shown. Ad synchronization may be spatial and/or temporal. For example, if a GM™ ad is shown in leaderboard ad 420 of FIG. 4, then ad synchronization may provide that either a specific complementary GM™ ad or categorically any other GM™ ad should be shown simultaneously in MPU 425. Likewise, if a GM™ ad is shown when a page first loads, then add synchronization may provide, for example, that the immediately next ad shown should be a GM™ ad, that the immediately next ad shown should be a related ad, or that at least one of the next three ads should be a GM™ ad. By passing the cumulative PageState as well as the seg PageState variables to the function refreshing ads, embodiments may provide for spatial and/or temporal ad synchronization.

Frequency capping provides that the same ad or similar ads should not be displayed to a user more than a given frequency. To determine the frequency with which an ad is displayed to a user, each ad may pass and update a frequency capping cookie every time the ad is loaded. The JSON ad request may then pass the value stored in the frequency cap cookie so that the ad server can choose appropriate ads to serve. However, because refreshable/deferred ads may be loaded asynchronously, multiple ads could write to the frequency cap cookie at the same time, thus overwriting each other's changes. There is even a risk that deferred ads may be loaded in such a close temporal proximity to static ads that the static ads updates to the frequency cap cookie may be overwritten.

To solve this, each ad can set a lock flag in the page before updating the frequency lock cookie and then release the lock flag when the update is done. Before each ad attempts to update the frequency lock cookie, the ad will check for the existence of the lock flag, and if the lock flag is present, will wait for the lock flag to be released before attempting again to update the cookie (e.g., by waiting a set amount of time and checking for the presence of a lock flag again). To prevent prolonged waiting in the event that a lock flag fails to be released, a function may periodically check a timestamp on the lock and if the lock flag has existed for too long, an error will be assumed and the lock flag will be released. Additionally, the function may be configured to determine whether it is running in an IFRAME or in the webpage itself to know where to look for the lock flag. An example of pseudo code to configure frequency capping code to use lock flags is set forth below.

```
var madCapFunc = function( ) {
var context = window;
if (inFriendlyIFrame) {context= parent;}
// if lock defined and younger than 200 milliseconds
if(context.lock != undefined && now- context.lock <= 200){
    // locked out, run again in 50 milliseconds
    setTimeout("runMadCap( )" ,50);
    return;
}
context.lock = timestamp; //take lock
//FREQUENCY CAPPING CODE GOES HERE
context.lock = undefined; //release lock }
```

Refreshable ads according to embodiments disclosed herein also provide for preserving a quality impression. To preserve a quality impression, when an ad is shown, it should not be refreshed within a given frequency, for example within an amount of time or within a number of events. For example, a refreshable ad may be generally configured to be refreshed every time a user clicks on a thumbnail in a slideshow. However, a user may quickly browse through a slideshow and click on five or more thumbnails within only a few seconds. In such an instance, it may be desirable to prevent loading five ads in rapid succession because it may degrade the quality of the impression the ads have on the user. Accordingly, a timer may be used to prevent ads from refreshing faster than desired. Exemplary pseudo code for a timer provides: (1) when an ad loads, start a timer for a determined time; (2) if an event (e.g., a user interaction) that would cause the ad to refresh happens while the timer is still running (i.e., in awaitTime), do nothing; and (3) if the event that would cause the ad to refresh happens after the timer has run out, refresh the ad and restart the timer. Thus, an embodiment having a 30 second timer would perform according to the timeline shown below.

0 seconds, load ad, start timer
2 seconds, user interacts with page, do not refresh ad
30 seconds, timer runs out
35 seconds, user interacts with page, refresh ad, restart timer
65 seconds (35+30), timer runs out
90 seconds, user interacts with page, refresh ad, restart timer Because embodiments may refresh ads individually or in groups, a timer may be used for each ad. In other words, each ad placement needs to track how much time has passed since the last ad refresh for the given placement to guarantee a quality ad impression for the given placement. If a function to refresh a given ad is called while that ad is still in a waitTime then the ad may not be refreshed but other ads in the same request may be refreshed. Thus, embodiments may set a variable in each placeholder (e.g., a lastRefreshTime variable may be placed in each DIV) after the ad is refreshed and the ad may only be refreshed again when (now—lastRefreshTime>waitTime).

As discussed above, the function to refresh the dynamic ads on a page may be called with no arguments the first time it is called at the bottom of the page. As also discussed above, the same function may be called to refresh the ads at a later time. When called to refresh the ads, the function may be called with no arguments to refresh all ads or a variable may be passed to the function to tell it to refresh only one or more specific ad on the page. In still other embodiments, the ad refresh function may be called with an override object. The override object may be appended to the placeholder for an ad so that when a refresh request is sent, a particular ad or an ad from a particular category or set of ads may be selected to be inserted into the placeholder.

As discussed above, embodiments may refresh a specific ad, multiple specific ads, or all ads on a page in response to a user interaction. Advertisers, however, generally only want an ad to refresh in response to a strong user interaction. Generally, this means that advertisers only want an ad to refresh in response to a user interaction that evidences that a user has viewed the ad. This is to avoid an advertiser paying to have an ad refreshed frequently when a user may not even be present at a computer. Strong user interactions may be, for example the user clicking (e.g., left clicking, right clicking, double-clicking, etc.), moving a mouse over a specific object on the webpage, or "scrubbing" an object on the webpage (i.e., moving a scroll bar so that the user can see the object). Embodiments disclosed herein may be configured to refresh one or more ads in response to receiving a strong user interaction as a trigger.

A webpage containing a rich internet application ("RIA") or streaming content, such as streaming video, a slideshow, etc., may include in-page ads (e.g., ads outside of a video player or rich internet application) driven to refresh at appropriate times synced to the content on the web page (e.g., synced to a portion of the streaming video, synced to an advertisement shown in the video, etc.). For example, webpage 400 shown in FIG. 4 may play media 415, for example a streaming video. The streaming video may be configured to periodically play streaming ads. A function may refresh any or all of leaderboard ad 420, MPU ad 425 or SKY ad 430 in response to playing a streaming ad. Additionally, the function may be called with an override object to specify a specific ad to use or a group of ads to choose from. For example, if a video Ford™ ad is inserted into a video stream, when the video ad is played a function may be called to update one or more in-page ad and to also include an override object specifying that the refreshed ad be a Ford™ ad. Alternatively, for a specific Ford™ Mustang™ video ad inserted into a video stream, a function may be called with an override object to specify a specific ad for a Ford™ Mustang™ to be inserted in specific in-page ads.

In similar fashion to streaming video, embodiments may synchronize in-page advertisements with advertisements in RIAs. For example, an RIA for fantasy football may show advertisements in part of the RIA or periodically an advertisement may be shown across the entire RIA. When an ad in the RIA is displayed, a function may be called to refresh one or more of the in-page ads. Additionally, the function may be called with an override object to specify a specific ad to use or a category or set of ads to choose from. For example, if a Ford™ ad is inserted into the RIA, when the ad is displayed a function may be called to update one or more in-page ad and to also include an override object specifying that the refreshed ad be a Ford™ ad. Alternatively, for a specific Ford™ Mustang™ ad inserted into an RIA, a function may be called with an override object to specify a specific ad for a Ford™ Mustang™ to be inserted in specific in-page ads.

Of course, while some embodiments includes advertisements within streaming video and RIAs, one of ordinary skill in the art understands that other embodiments may synchronize in-page ads with ads shown in connection with other types of media, for example Flash™ applications, streaming audio, slide shows, or any other media provided through or in connection with a webpage. Further, in addition to synchronization, the competitive blocking, frequency capping, and preservation of quality impression features described above with relation to in-page ads may also be used in conjunction with other ads, for example streaming ads or ads in RIAs.

Other embodiments allow a media played on a webpage to select ads to play with the media that synchronize with in-page ads, that do not compete with in-page ads, and/or that are not played within a given frequency of particular in-page ads. Embodiments allow a media player to receive the PageState variables to know what in-page ads are currently shown and the history of in-page ads. Thus, an ad request, for example an AJAX ad requesting, requesting an ad, for example an XML ad, to insert into a media stream may include the PageState variables in the ad request. The ad client may then select an ad complying with competitive blocking, ad synchronization, and frequency bars based on the combined cumulative PageState and seg PageState.

While this disclosure often refers to content, such as creatives, by the terms "ads" or "advertisements", one of ordinary skill in the art understands that any content may be delivered to a browser according to embodiments disclosed herein.

Additionally, this disclosure refers to loading ads at the "bottom" of the page, thereby deferring ad loading until after other content on a page has loaded. Of course, it is not required that ads load at the bottom of the page, in other embodiments ads may be loaded after some content on the page is loaded but before other content on the page is loaded. Embodiments may even load ads first, which may initially defer loading of page content but may allow for creatives shown on the page to be refreshed.

The invention has been described through embodiments. However, various modifications can be made without departing from the scope of the invention as defined by the appended claims and legal equivalents.

What is claimed is:

1. A method of rendering a webpage via a browser, the method performed by one or more processors and comprising:
   receiving webpage elements to render the webpage;
   creating a global object to define one or more advertisement placeholders on the webpage;
   inserting a proxy location into the webpage elements to assert a local domain for ad request to an ad server;

using the global object, transmitting the ad request to the ad server;
based on the ad request, receiving ad metadata from the ad server;
parsing the ad metadata to receive one or more frames to be inserted into the one or more advertisement placeholders;
using the one or more frames, retrieving advertising content from the ad server; and
inserting the retrieved advertising content into the one or more advertisement placeholders.

2. The method of claim 1, wherein the inserted proxy location enables the browser to perceive the ad request as originating from a local domain of the webpage.

3. The method of claim 2, wherein the inserted proxy location enables the browser to perceive the one or more frames as being associated with the local domain of the webpage.

4. The method of claim 1, wherein the webpage elements comprise HTML code of the webpage, and wherein the global object comprises a number of DIV tags inserted into the HTML code to define the one or more advertisement placeholders.

5. The method of claim 1, further comprising:
associating each advertisement placeholder with a unique identifier.

6. The method of claim 1, wherein each of the one or more frames comprise a uniform resource locator that utilizes the proxy location to retrieve the advertising content from the ad server.

7. The method of claim 1, further comprising:
identifying media content on the webpage;
identifying a first advertisement associated with a product brand in the media content;
in response to detecting the first advertisement content, requesting additional advertising content for the product brand.

8. The method of claim 7, further comprising:
based on requesting the additional advertising content, receiving one or more additional advertisements for the product brand associated with the first advertisement; and
inserting the one or more additional advertisements into the one or more advertisement placeholders.

9. The method of claim 8, wherein the media content comprises streaming video content.

10. The method of claim 1, further comprising: implementing frequency capping to prevent same or similar advertising content to be presented over a given frequency.

11. The method of claim 10, wherein implementing frequency capping comprises (i) updating a frequency cap cookie for each advertisement inserted into one of the one or more advertisement placeholders, and (ii) transmitting a frequency value, associated with the same or similar advertising content, to the ad server in conjunction with an ad request, the frequency value being stored in the frequency cap cookie.

12. The method of claim 1, wherein the ad request corresponds to a JavaScript Object Notation (JSON) request, and wherein the ad metadata is comprised in a received JSON object from the ad server.

13. A non-transitory computer readable medium storing instructions for rendering a webpage via a browser, wherein the instructions, when executed by one or more processors of a client device, cause the client device to:
receive webpage elements to render the webpage;
create a global object to define one or more advertisement placeholders on the webpage;
insert a proxy location into the webpage elements to assert a local domain for ad request to an ad server;
using the global object, transmit the ad request to the ad server; based on the ad request, receive ad metadata from the ad server; parse the ad metadata to receive one or more frames to be inserted into the one or more advertisement placeholders;
using the one or more frames, retrieve advertising content from the ad server; and
insert the retrieved advertising content into the one or more advertisement placeholders.

14. The non-transitory computer readable medium of claim 13, wherein the inserted proxy location enables the browser to perceive the ad request as originating from a local domain of the webpage.

15. The non-transitory computer readable medium of claim 14, wherein the inserted proxy location enables the browser to perceive the one or more frames as being associated with the local domain of the webpage.

16. The non-transitory computer readable medium of claim 13, wherein the webpage elements comprise HTML code of the webpage, and wherein the global object comprises a number of DIV tags inserted into the HTML code to define the one or more advertisement placeholders.

17. The non-transitory computer readable medium of claim 13, wherein each of the one or more frames comprise a uniform resource locator that utilizes the proxy location to retrieve the advertising content from the ad server.

18. The non-transitory computer readable medium of claim 13, wherein the executed instructions further cause the client device to:
identify media content on the webpage;
identify a first advertisement associated with a product brand in the media content;
in response to detecting the first advertisement content, request additional advertising content for the product brand.

19. The non-transitory computer readable medium of claim 18, wherein the executed instructions further cause the client device to:
based on requesting the additional advertising content, receive one or more additional advertisements for the product brand associated with the first advertisement; and
insert the one or more additional advertisements into the one or more advertisement placeholders.

20. A computing device comprising:
a display;
one or more processors; and
one or more memory resources storing instructions for rendering a webpage via a browser, wherein the instructions, when executed by one or more processors of the computing device, cause the computing device to:
receive webpage elements to render the webpage;
create a global object to define one or more advertisement placeholders on the webpage;
insert a proxy location into the webpage elements to assert a local domain for ad request to an ad server;
using the global object, transmit the ad request to the ad server;
based on the ad request, receive ad metadata from the ad server;

parse the ad metadata to receive one or more frames to be inserted into the one or more advertisement placeholders;
using the one or more frames, retrieve advertising content from the ad server; and
insert the retrieved advertising content into the one or more advertisement placeholders.

\* \* \* \* \*